(12) United States Patent
Shannon

(10) Patent No.: US 11,276,159 B1
(45) Date of Patent: Mar. 15, 2022

(54) SYSTEM AND METHOD FOR ROCKET ENGINE HEALTH MONITORING USING DIGITAL IMAGE CORRELATION (DIC)

(71) Applicant: United Launch Alliance L.L.C., Centennial, CO (US)

(72) Inventor: Ryan Shannon, Castle Rock, CO (US)

(73) Assignee: United Launch Alliance, L.L.C., Centennial, CO (US)

( * ) Notice: Subject to any disclaimer, the term of this patent is extended or adjusted under 35 U.S.C. 154(b) by 123 days.

(21) Appl. No.: 16/113,064

(22) Filed: Aug. 27, 2018

Related U.S. Application Data

(60) Provisional application No. 62/671,888, filed on May 15, 2018.

(51) Int. Cl.
*G06T 7/00* (2017.01)
*G01M 15/14* (2006.01)

(52) U.S. Cl.
CPC .............. *G06T 7/001* (2013.01); *G01M 15/14* (2013.01); *G06T 2207/10016* (2013.01); *G06T 2207/10048* (2013.01)

(58) Field of Classification Search
USPC ........................................................ 348/128
See application file for complete search history.

(56) References Cited

U.S. PATENT DOCUMENTS 3,158,744 A  11/1964 Bernstein
3,488,106 A   1/1970 Lohmann
(Continued)

FOREIGN PATENT DOCUMENTS

CN   103592368 B  *  2/2016
WO   WO 2006/008589      1/2006
(Continued)

OTHER PUBLICATIONS

Anand Krishna Asundi, Chi-Shing Chan, Sajan R. Marokkey, "360-deg profilometry: new techniques for display and acquisition," Opt. Eng. 33(8) (Aug. 1, 1994) https://doi.org/10.1117/12.176507. (Year: 1994).*

(Continued)

*Primary Examiner* — Christopher S Kelley
*Assistant Examiner* — Ana Picon-Feliciano
(74) *Attorney, Agent, or Firm* — Sheridan Ross P.C.

(57) ABSTRACT

Embodiments described herein may be applied to monitoring and evaluating rocket engine and other reusable components' health by tracking full-field stochastic patterns using Digital Image Correlation (DIC) to detect deformation. In particular, rocket engine cylindricity enables pre-flight and post-flight non-destructive inspection utilizing a turntable to detect local fatigue. In accordance with embodiments of the present disclosure, a rocket engine may undergo a DIC process, where the rocket engine is rotated via a turntable. Accordingly, the use of a turntable allows a single camera DIC setup to acquire data indicative surface measurements about the entire rocket engine. The rocket engine may then be flown and subsequently recovered. After recovery, the rocket engine again may undergo DIC processing, where the rocket engine is rotated via the turntable. The pre- and post-flight data may be compared to provide evidence of the existence of a deformation or lack thereof.

16 Claims, 5 Drawing Sheets

(56) References Cited

U.S. PATENT DOCUMENTS

| | | | |
|---|---|---|---|
| 4,691,332 | A | 9/1987 | Burstein et al. |
| 5,119,408 | A | 6/1992 | Little et al. |
| 6,637,266 | B1 | 10/2003 | Froom |
| 6,789,900 | B2 | 9/2004 | Van de Velde |
| 6,980,326 | B2 | 12/2005 | Tsuchiya et al. |
| 6,996,480 | B2 | 2/2006 | Giurgiutiu et al. |
| 7,016,532 | B2 | 3/2006 | Boncyk et al. |
| 7,268,916 | B2 | 9/2007 | Kokemohr et al. |
| 7,400,950 | B2 | 7/2008 | Reich |
| 7,447,598 | B2 | 11/2008 | Malkin et al. |
| 7,596,284 | B2 | 9/2009 | Samadani |
| 7,596,470 | B2 | 9/2009 | Kim |
| 7,676,345 | B2 | 3/2010 | Gustavsson et al. |
| 8,303,505 | B2 | 11/2012 | Webler et al. |
| 8,319,842 | B2 | 11/2012 | Shibata |
| 8,380,000 | B2 | 2/2013 | Lee et al. |
| 8,466,978 | B2 | 6/2013 | Safai |
| 8,624,776 | B2 | 1/2014 | Jales et al. |
| 8,786,716 | B2 | 7/2014 | Zhou |
| 9,042,516 | B2 | 5/2015 | Grossnickle et al. |
| 9,497,380 | B1 | 11/2016 | Jannard et al. |
| 9,852,330 | B1 | 12/2017 | Shannon |
| 10,713,516 | B2 | 7/2020 | Shannon |
| 2005/0146708 | A1* | 7/2005 | Shi .................... G01N 21/88 356/35.5 |
| 2005/0279172 | A1 | 12/2005 | Schreier et al. |
| 2007/0165208 | A1 | 7/2007 | Cowburn et al. |
| 2008/0031513 | A1 | 2/2008 | Hart |
| 2008/0051957 | A1 | 2/2008 | Breed et al. |
| 2011/0262026 | A1* | 10/2011 | Hori .................... G01M 13/00 382/141 |
| 2012/0041617 | A1 | 2/2012 | Aimura et al. |
| 2013/0044228 | A1 | 2/2013 | Corey et al. |
| 2013/0142396 | A1 | 6/2013 | Fletcher et al. |
| 2014/0036042 | A1* | 2/2014 | Xia .................... G02B 21/361 348/49 |
| 2014/0160279 | A1 | 6/2014 | Grossnickle et al. |
| 2014/0266712 | A1 | 9/2014 | Bobo et al. |
| 2018/0023410 | A1* | 1/2018 | Lee .................... F02K 7/005 415/1 |
| 2018/0306691 | A1* | 10/2018 | Goenezen ............ G01N 3/32 |
| 2020/0302204 | A1 | 9/2020 | Shannon |

FOREIGN PATENT DOCUMENTS

| | | |
|---|---|---|
| WO | WO 2008/135841 | 11/2008 |
| WO | WO 2008/152346 | 12/2008 |
| WO | WO 2013/104717 | 7/2013 |
| WO | WO 2013/158933 | 10/2013 |

OTHER PUBLICATIONS

Badel P, Genovese K, Avril S. 3D Residual Stress Field in Arteries: Novel Inverse Method Based on Optical Full-field Measurements. Strain. 2012;48(6):528-538. doi:10.1111/str.12008. (Year: 2012).*

Giesko, Tomasz & Borohski, Dariusz & Zbrowski, Andrzej & Czajka, Piotr. (2009). Detection and Measurement of Fatigue Cracks in Solid Rocket Propellants. Problemy Eksploatacji/Maintenance Problems. 3. 75-84. (Year: 2009).*

Hampson, Michael E.. "Reusable Rocket Engine Turbopump Condition Monitoring." (1984). Website:https://ntrs.nasa.gov/api/citations/19850018596/downloads/19850018596.pdf (Year: 1984).*

Smith, Stephen, et al. "Development of a Rotating Probe System for Supersonic Combustion Experiments." 45th AIAA/ASME/SAE/ASEE Joint Propulsion Conference & Exhibit. 2009. (Year: 2009).*

Qing XP, Chan H-L, Beard SJ, Kumar A. An Active Diagnostic System for Structural Health Monitoring of Rocket Engines. Journal of Intelligent Material Systems and Structures. 2006; 17(7):619-628. doi:10.1177/1045389X06059956 (Year: 2006).*

Peter J. Disimile, Bridget Shoe, and Norman Toy "Health monitoring of rocket engines using image processing", Proc. SPIE 1483, Signal and Image Processing Systems Performance Evaluation, Simulation, and Modeling, (Jul. 1, 1991); https://doi.org/10.1117/12.45728 (Year: 1991).*

• Youngberg, James E., and Paul Burstein. "Three-dimensional computed tomography for rocket motor inspection." Nondestructive Evaluation of Aging Aircraft, Airports, Aerospace Hardware, and Materials. Vol. 2455. International Society for Optics and Photonics, 1995 (Year: 1995).*

Machine translation of CN-103592368-B (Year: 2016).*

U.S. Appl. No. 14/809,563, filed Jul. 27, 2015 now U.S. Pat. No. 9,852,330.

U.S. Appl. No. 15/853,272, filed Dec. 22, 2017 now U.S. Pat. No. 10,713,516.

U.S. Appl. No. 16/895,870, filed Jun. 8, 2020.

"Cost-Efficient Testing for Jet Engines Inspections," UNIWEST, Apr. 2016, 3 pages.

"Engineering Innovations," NASA, 2011, Ed. Wayne Hale, Wings In Orbit: Scientific and Engineering Legacies of the Space Shuttle, Chapter 4, pp. 158-181 [retrieved online from: www.nasa.gov/centers/johnson/pdf/584727main_Wings-ch4a-pgs157-181.pdf].

"SRSView-Shock Response Spectrum Analysis," Signalysis, Inc., 2015, retrieved from http://signalysis.com/company/signalysis-at-work/shock-response-spectrum-analysis/, 8 pages.

Alexander, "Shock Response Spectrum-A Primer," Sound & Vibration, 2009, 9 pages.

Chu et al. "Digital Image Correlation Techniques for Aerospace Applications," ASNT Fall Conference, At Charleston, SC, Volume: Aerospace Session, Oct. 2014, 8 pages.

Eberl et al., "Digital Image Correlation and Tracking with MATLAB," MathWorks, Inc., 2010, 31 pages.

Eberl et al., "Digital Image Correlation and Tracking," MathWorks, Inc., 2010, 38 pages.

Gaberson, "Pseudo Velocity Shock Analysis Conclusions and Final Comments," Vibration Data, 2011, retrieved from www.vibrationdata.com/tutorials2/Gaberson12Conc110729.pdf, 40 pages.

Gaberson, "Pseudo Velocity Shock Spectrum Rules for Analysis of Mechanical Shock," Vibration Data, 2007, retrieved from www.vibrationdata.com/tutorials2/pvsrs_rules.pdf, 36 pages.

Gaberson, "Shock Severity Estimation," Sound & Vibration, 2012, pp. 12-19.

Gradl "Digital Image Correlation Techniques Applied to Large Scale Rocket Engine Testing," 52nd IAII/SAE/ASEE Joint Propulsion Conference, Salt Lake City, UT, USA, Jul. 2016, 18 pages.

Hutin, "Understanding the Use and Applications of Shock Response Spectrum Method," Data Physics Corporation, 2005, 7 pages.

Irvine, "An Introduction to the Shock Response Spectrum, Revision S,", Vibration Data, 2012, retrieved from http://www.vibrationdata.com/tutorials2/srs_intr.pdf, 73 pages.

Irvine, "Potential Aliasing in Pyrotechnic Shock Data: Numerical Experiments," Vibration Data, 2008, retrieved from http://www.vibrationdata.com/tutorials2/aliasing_numerical_experiments.pdf, 8 pages.

Irvine, "Shock and Vibration Response Spectra Course, Unit 15, Integration of a Power Spectral Density Function," Vibration Data, 2001, retrieved from http://www.vibrationdata.com/Course_Units/UNIT15.pdf, 6 pages.

IRVINE_"The Need for Analog Anti-Aliasing Filters in the Pyrotechnic Shock Testing of Avionics Components," 2008, retrieved from https://www.google.com/?gws_rd=ssl#q=The+Need+for+Analog+Anti-Aliasing+Filters+in+the+Pyrotechnic+Shock+Testing+of+Avionics+Components, 6 pages.

Lall et al., "High Speed Digital Image Correlation for Transient-Shock Reliability of Electronics," Electronic Components and Technology Conference, 2007, pp. 924-939.

Lu et al. "Surface Deformation Measurements of a Cylindrical Specimen by Digital Image Correlation," Experimental Mechanics, Dec. 1997, vol. 37, No. 4, pp. 433-434.

Lu et al. "Deformation Measurements by Digital Image Correlation: Implementation of a Second-order Displacement Gradient," Experimental Mechanics, Dec. 2000, vol. 40, No. 4, pp. 393-400.

Mckie et al. "Inspection of Rocket Engine Components Using Laser-Based Ultrasound," Nondestructive Characterization of Material VII, 1998, pp. 111-116, (pp. 111 and 112).

(56) References Cited

OTHER PUBLICATIONS

McNeelege et al. "Robotic NDE Inspection of Advanced Solid Rocket Motor Casings," American Institute of Aeronautics and Astronautics, Inc., 1993, pp. 354-366.
Moler et al. "Nondestructive Evaluation and Inspection Programs for Pershing II Motors," US Army Corps of Engineers, USACERL Technical Report M-90/16, Jun. 1990, 45 pages.
Palanivelu et al., "Validation of digital image correlation technique for impact loading applications," DYMAT, 2009, pp. 373-379.
Pan et al., "Equivalence of digital image correlation criteria for pattern matching," Optical Society of America, 2010, vol. 49(28), pp. 5501-5509.
Pan et al., "Two-dimensional digital image correlation for in-plane displacement and strain measurement: a review," Measurement Science and Technology, 2009, vol. 20, pp. 1-17.
Peters III et al. "Whole-field Experimental Displacement Analysis of Composite Cylinders," Experimental Mechanics, Mar. 1989, vol. 29, No. 1, pp. 58-62, (pp. 58, 59 only).
Teagle "Technical Specification SDI-5350: Automated Ultrasonic Precision Disk Inspection System," Structural Diagnostics, Inc. Aug. 2012, 12 pages.
Vassoler et al., "Error Analysis of the Digital Image Correlation Method," Asociacion Argentina, 2010, 13 pages.
Wang et al., "A New Blood Velocity Estimator for Suppressing Frequency Aliasing in Color Flow Imaging," Proceedings of the IEEE International Conference on Mechatronics and Automation, 2006, pp. 1259-1263.

\* cited by examiner

SYSTEM AND METHOD FOR ROCKET ENGINE HEALTH MONITORING USING DIGITAL IMAGE CORRELATION (DIC)

CROSS REFERENCE TO RELATED APPLICATION

The present application claims the benefits of and priority, under 35 U.S.C. § 119(e), to U.S. Provisional Application No. 62/671,888 filed May 15, 2018 by Shannon and entitled "System and Method for Rocket Engine Health Monitoring Using Digital Image Correlation (DIC)" of which the entire disclosure is incorporated herein by reference for all purposes.

FIELD OF THE DISCLOSURE

Embodiments of the present disclosure relate generally to methods and systems for monitoring complex, reusable physical structures or devices and more particularly to using Digital Image Correlation (DIC) to monitor a reusable rocket component such as a rocket engine.

BACKGROUND

Reducing the cost of space launch is critical to enabling mankind's potential in space and thus, launch vehicle reuse has and will continue to be studied by launch vehicle service providers to reduce the cost of launch. Launch service providers salvage main engines through mid-air recovery and other methods and reuse them again aboard saving a large portion of the booster propulsion cost. Regardless the rocket reuse strategy, re-certification for launch is critical and costs associated detract from the reuse business cases. Monitoring engine system health will be a core competency to enable such reuse.

Detecting fatigue in parts of the engine system due to residual strain and creep and damage from launch and recovery is a key component of rocket engine reuse system health monitoring. Fatigue failures are fractures caused by repeated loading at stresses considerably lower than those causing failure by a single load. Previous approaches to detecting fatigue can be classified as destructive or non-destructive. Destructive testing includes contouring, layer removal, slitting, hole drilling, and others. Since these methods are destructive, they are not well-suited for use on structures or devices intended to be reused. Non-Destructive testing includes pre and post launch three-dimensional scanning, reading in-flight sensor arrays, X-ray, ground excitation/response, and others. However, these testing methods are expensive, can be limited in their applicability, and may not always be suitable for various other reasons. Digital Image Correlation (DIC) is a non-contact measurement technique that uses high-resolution digital cameras and machine-vision systems to accurately measure surface deformation in two or three dimensions. Multi-DIC system measurements can be used to test an object. However, for a large, cylindrical structure, such as a rocket engine, many DIC systems are needed to surround and thoroughly test the structure which can become cost punitive if not prohibitive. Hence, there is a need for improved methods and systems for monitoring complex, reusable physical structures or devices.

BRIEF SUMMARY

Embodiments described herein may be applied to monitoring and evaluating rocket engine and other expensive components health by tracking full-field stochastic patterns using the Digital Image Correlation (DIC) method to detect global and local deformation quickly and cost efficiently. In particular, rocket engine cylindricity enables pre-flight and post-flight non-destructive inspection utilizing a turntable to detect local fatigue. In accordance with embodiments of the present disclosure, a rocket engine may undergo a DIC process, where the rocket engine is rotated via a turntable. Accordingly, the use of a turntable allows a single camera DIC setup to acquire data indicative of global and local surface measurements about the entire rocket engine. The rocket engine may then be flown and subsequently recovered. After recovery, the rocket engine again may undergo DIC processing, where the rocket engine is rotated via the turntable. The pre- and post-flight data may be compared to provide evidence of the existence of a deformation or lack thereof.

According to one embodiment, a method for monitoring a reusable structure can comprise rotating a turntable by a turntable controller in response to instructions received from a fatigue and damage monitoring system. The turntable can have the reusable structure mounted thereon. The fatigue and damage monitoring system can record a first video of a surface of the reusable structure while the turntable is rotating. The first video can be captured by a camera at a single, fixed location relative to the turntable. The camera can comprise a visual spectrum camera or a thermal camera. After a use of the reusable structure, the turntable with the reusable structure mounted thereon can again be rotated by the turntable controller in response to instructions received from the fatigue and damage monitoring system which can record a second video of the surface of the reusable structure captured by the camera while the turntable is rotating. The fatigue and damage monitoring system can then determine an amount of fatigue or damage in one or more parts or portions of the reusable structure based on the first video and the second video.

For example, the reusable structure can comprise a stochastic pattern applied to the surface of the reusable structure. Determining the amount of fatigue or damage in one or more parts or portions of the reusable structure further comprises determining an amount of physical deformation in each of the one or more parts or portions of the reusable structure based on the first video and the second video, for example, by applying Digital Image Correlation (DIC) processing to the first video and the second video using the stochastic pattern applied to the surface of the reusable structure.

The fatigue and damage monitoring system can then generate one or more indications of the determined amount of fatigue or damage in the one or more parts or portions of the reusable structure. A representation of the determined amount of fatigue or damage in the one or more parts or portions of the reusable structure can then be presented through a user interface. For example, the representation of the one or more indications of the determined amount of fatigue or damage in the one or more parts or portions of the reusable structure can comprise a video image, still image, or animated image of the one or more parts or portions of the structure overlaid with the indication of the determined amount of fatigue or damage.

According to another embodiment, a system for monitoring a reusable structure can comprise a turntable, wherein the reusable structure is mounted onto the turntable when being tested, a turntable controller coupled with the turntable and controlling rotation of the turntable, a camera at a single, fixed location relative to the turntable, wherein the camera captures video of a surface of the reusable structure when mounted on the turntable, and a fatigue and damage monitoring system communicatively coupled with the turntable controller and camera. The fatigue and damage monitoring system can comprise a processor and a memory coupled with and readable by the processor and storing therein a set of instructions which, when executed by the processor, causes the processor to instruct the turntable controller to rotate the turntable, record a first video of the surface of the reusable structure captured by the camera while the turntable is rotating, record a second video of the surface of the reusable structure captured by the camera while the turntable is rotating, the second video recorded after a use of the reusable structure, and determine an amount of fatigue or damage in one or more parts or portions of the reusable structure based on the first video and the second video.

The camera can comprise a visual spectrum camera or a thermal camera. In some cases, the reusable structure can comprise a stochastic pattern applied to the surface of the reusable structure. Determining the amount of fatigue or damage in one or more parts or portions of the reusable structure can further comprise determining an amount of physical deformation in each of the one or more parts or portions of the reusable structure based on the first video and the second video, for example, by applying Digital Image Correlation (DIC) processing to the first video and the second video using the stochastic pattern applied to the surface of the reusable structure.

The instructions can further cause the processor of the fatigue and damage monitoring system to generate one or more indications of the determined amount of fatigue or damage in the one or more parts or portions of the reusable structure and present, through a user interface, a representation of the one or more indications of the determined amount of fatigue or damage in the one or more parts or portions of the reusable structure. The representation of the one or more indications of the determined amount of fatigue or damage in the one or more parts or portions of the reusable structure can comprise a video image, still image, or animated image of the one or more parts or portions of the structure overlaid with the indication of the determined amount of fatigue or damage.

According to yet another embodiment, a fatigue and damage monitoring system can comprise a processor and a memory coupled with and readable by the processor and storing therein a set of instructions which, when executed by the processor, causes the processor to monitor a reusable structure by recording a first video of a surface of the reusable structure captured by the camera while the reusable structure is being rotated on a turntable, the first video recorded before a use of the reusable structure, recording a second video of the surface of the reusable structure captured by the camera while the reusable structure is being rotated on the turntable, the second video recorded after the use of the reusable structure, and determining an amount of fatigue or damage in one or more parts or portions of the reusable structure based on the first video and the second video. Determining the amount of fatigue or damage in one or more parts or portions of the reusable structure can further comprise determining an amount of physical deformation in each of the one or more parts or portions of the reusable structure based on the first video and the second video by applying Digital Image Correlation (DIC) processing to the first video and the second video using a stochastic pattern applied to the surface of the reusable structure.

Figure 1:
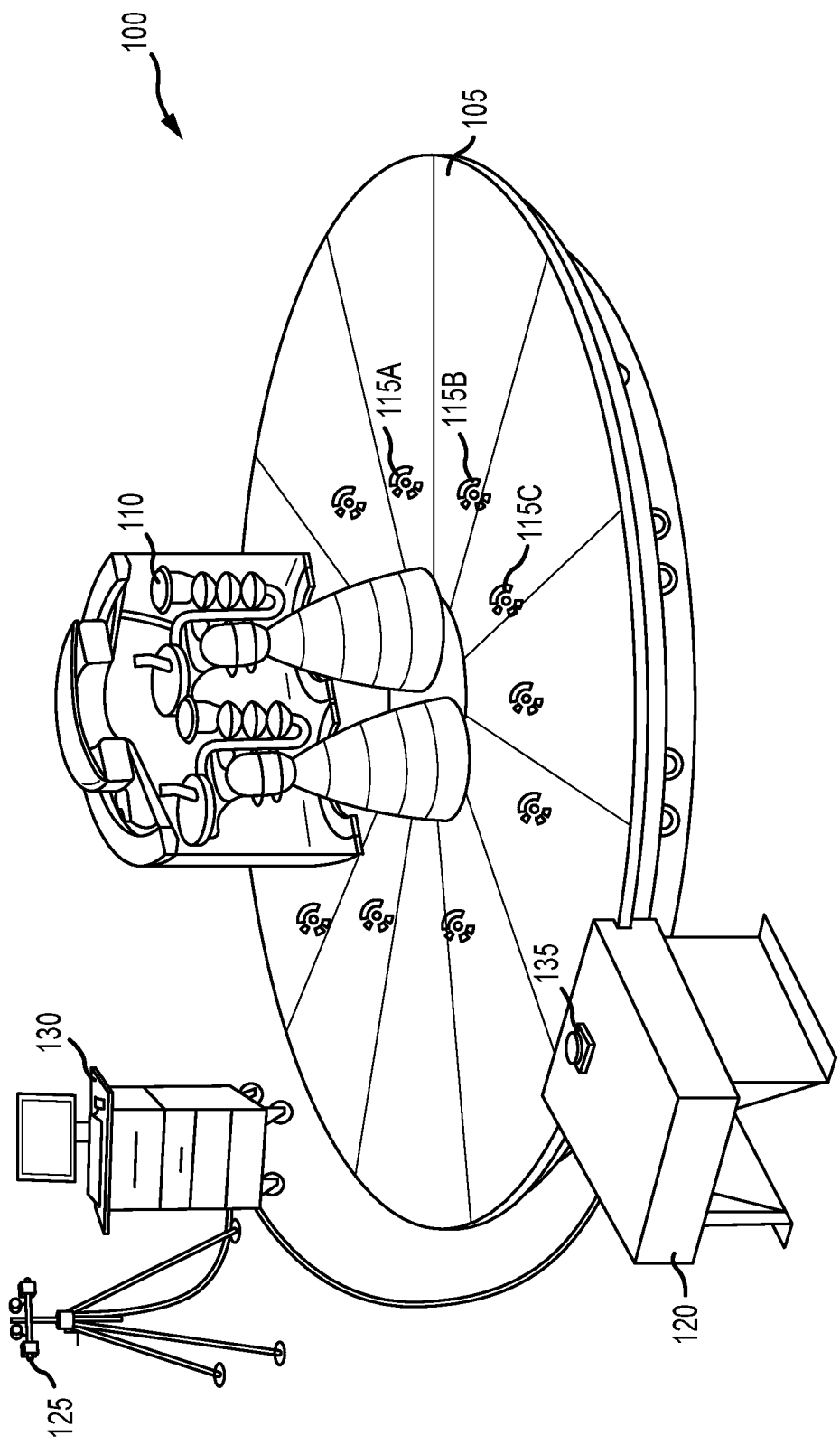
FIG. 1 illustrates elements of an exemplary system for monitoring and evaluating a complex, reusable physical structure or device such as a rocket engine according to one embodiment of the present disclosure.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only, and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Embodiments described herein may be applied to monitoring and evaluating rocket engine and other expensive components health by tracking full-field stochastic patterns using the Digital Image Correlation (DIC) method to detect global and local deformation quickly and cost efficiently. Patterns may be marked with non-visible ink such as detectable under black light or markings detectable in infrared to mask presence or enhance measurement. Patterns can be used to derive FEM to analysis, as is hardware. In particular, rocket engine cylindricity enables pre-flight and post-flight non-destructive inspection utilizing a turntable to detect local fatigue and damage. In accordance with embodiments of the present disclosure, a rocket engine may undergo a DIC process, where the rocket engine is rotated via a turntable. Accordingly, the use of a turntable allows a single camera DIC setup to acquire data indicative of global and local surface measurements about the entire rocket engine. The rocket engine may then be flown and subsequently recovered. After recovery, the rocket engine again may undergo DIC processing, where the rocket engine is rotated via the turntable. The pre- and post-flight data may be compared to provide evidence of the existence of a deformation or lack thereof.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 illustrates elements of an exemplary system for monitoring and evaluating a complex, reusable physical structure or device such as a rocket engine according to one embodiment of the present disclosure. As illustrated in this example, the system 100 can comprise a turntable 105 upon which a structure or device 110 under test, such as a rocket engine, for example, may be placed. The turntable may be driven by one or more electrical motors (not shown here) operated by a turntable controller 120. The system 100 can also include one or more high definition cameras 125. The cameras 125 can comprise, for example, a visual spectrum camera. According to one embodiment, the cameras 125 can further comprise one or more thermal cameras. In some cases, two or more thermal cameras may be arranged, for example on an arm or stand, to provide a stereo view. Generally speaking, the cameras 125 can be positioned to capture high definition spectral and/or thermal video of the structure or device 110 as the turntable rotates.

The system 100 can also include a fatigue and damage monitoring system 130 communicatively coupled with the cameras 125 and the turntable controller 120. Generally speaking, the fatigue and damage monitoring system 130 can receive the high definition video from the cameras 125 and apply DIC processes to the video to received video. For example, a new rocket engine or other structure or device 110 can be placed onto the turntable 105 and rotated by the motors driven by the turntable controller 120, e.g., in response to an instruction from the fatigue and damage monitoring system 130 to initiate testing. As the turntable 105 rotates, the cameras 125 can record video of the surfaces of the structure or device 110. According to one embodiment, the surfaces of the structure or device 110 can be painted or otherwise covered with a fine stochastic pattern, i.e., a pattern of randomly dispersed speckles or dots. This initial capture of the structure or device 110 can be saved by the fatigue and damage monitoring system 130 as a baseline for that structure or device 110.

According to one embodiment, the system 100 can also comprise a set of photogrammetric targets 115A-115C. These targets 115A-115C can be placed at various location around the outside of the structure or device 110 and can be used to index or adjust for positioning of the structure or device 110 on the turntable 105. Additionally, or alternatively, the turntable controller 120 can include and/or can receive input from a radial position sensor 135. If used, the radial position sensor 135 can provide an indication of the position of the turntable 105, and thus the structure or device 110, through it's rotation and can be used to index or adjust for positioning of the structure or device 110 on the turntable 105.

The structure or device 110 can then be placed into service, e.g., the rocket engine can be used in a space launch.

At a later time, the structure or device 110 can then be retested, e.g., after recovery of the rocket engine, or, in the case of another type of structure or device, at some point when the structure of device temporarily out of service. At such a time, the structure or device 110 can be placed back onto the turntable 105. Once again, the turntable 105 can be rotated and the cameras 125 can record video of the surfaces of the structure or device 110. The stochastic pattern recorded as the baseline for the structure or device 110 can be compared to the newly captured video by the fatigue and damage monitoring system 130 using DIC processes. Changes in the stochastic pattern captured in the video form the cameras 125 and detected by the fatigue and damage monitoring system 130 using the DIC processes can be used to determine an amount of deformation, e.g., compression, torsion, strain, etc., for a particular part or portion of a part of the overall structure or device 110. This amount of deformation can in turn be used by the fatigue and damage monitoring system 130 to determine an amount of fatigue and/or damage for that particular part or portion of a part of the overall structure or device 110. That is, knowing the mechanical properties of each part or portion of a part of the overall structure or device 110 and the amount of deformation detected, the fatigue and damage monitoring system 130 can determine how much fatigue and/or damage has been created in that part or portion of a part of the overall structure or device 110.

Once the amount of fatigue and/or damage for various parts or portions of the overall structure or device 110 has been determined, the fatigue and damage monitoring system 130 can generate and provide, for example through a graphical user interface presented through a display of the fatigue and damage monitoring system 130, any of a variety of indications or summations of these results. For example, the fatigue and damage monitoring system 130 can generate and present a video image, still image, or animated image of one or more parts or portions of the overall structure or device 110 overlaid with an indication of the determined amount of fatigue and/or damage for each parts or portions of the overall structure or device 110. These indications can include, but are not limited to, a color-coded indication of various ranges of fatigue and damage such a heatmap or similar representation.

Figure 2:
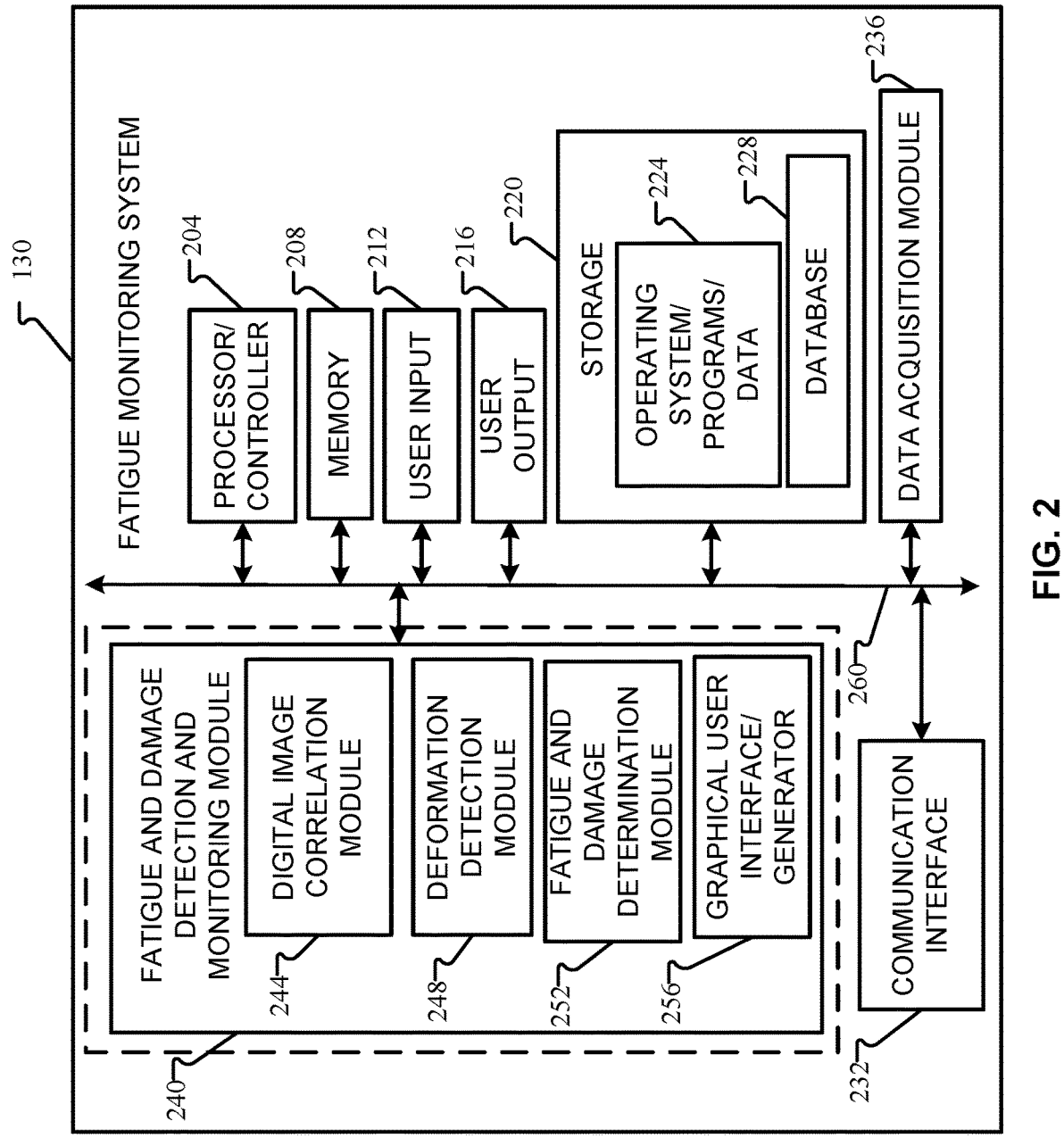
FIG. 2 is a block diagram illustrating components of an exemplary fatigue and damage monitoring system according to one embodiment of the present disclosure.

FIG. 2 is a block diagram illustrating components of an exemplary fatigue and damage monitoring system according to one embodiment of the present disclosure. More particularly, the fatigue and damage monitoring system 130 as described above may generally include a processor 204, memory 208, user input 212, user output 216, storage 220, a communication interface 232, a fatigue and damage detection and monitoring module 240, and, in some instances, a data acquisition module 236. Processor 204 is provided to execute instructions contained within memory 208. Accordingly, the processor 204 may be implemented as any suitable type of microprocessor or similar type of processing chip, such as any general-purpose programmable processor, digital signal processor (DSP) or controller for executing application programming contained within memory 208. Alternatively, or in addition, the processor 204 and memory 208 may be replaced or augmented with an application specific integrated circuit (ASIC), a programmable logic device (PLD), or a field programmable gate array (FPGA).

The memory 208 generally comprises software routines facilitating, in operation, pre-determined functionality of the fatigue and damage monitoring system 130. The memory 208 may be implemented using various types of electronic memory generally including at least one array of non-volatile memory cells (e.g., Erasable Programmable Read Only Memory (EPROM) cells or FLASH memory cells, etc.). The memory 208 may also include at least one array of Dynamic Random-Access Memory (DRAM) cells. The content of the DRAM cells may be pre-programmed and write-protected thereafter, whereas other portions of the memory 208 may be selectively modified or erased. The memory 208 may be used for either permanent data storage or temporary data storage. Alternatively, or in addition, data storage 220 may be provided. The data storage 220 may generally include storage for programs and data 224, storage for one or more modules included in the fatigue and damage detection and monitoring module 240, and storage for a database 228. The database 228 may store data associated with the fatigue and damage detection and monitoring module 240 and/or the data acquisition module 236. The communication interface 232 may allow the fatigue and damage monitoring system 130 to communicate over a communication network and/or communicate with the cameras 125, turntable controller 120, position sensor 135, and other systems or components. Further, the fatigue and damage monitoring system 130 may include a portion of, or an entirety of, a data acquisition system within the data acquisition module 236. For example, the data acquisition module 236 may include functionality and capability for performing high definition video capture and/or processing.

Digital Image Correlation (DIC) module 244 can receive digital video from the cameras 125, in some case through the data acquisition module 236. The DIC module 244 can receive the high definition video from the cameras 125 and apply DIC processes to the video to the received video. For example, as the turntable 105 rotates, the cameras 125 can record video of the surfaces of the structure or device 110. This initial capture of the structure or device 110 can be saved by the fatigue and damage detection and monitoring module 240 in a database 228 or elsewhere. As noted above, the surfaces of the structure or device 110 can be painted or otherwise covered with a fine stochastic pattern, i.e., a pattern of randomly dispersed speckles or dots. When the structure or device 110 is subsequently re-tested, the stochastic pattern recorded as the baseline can be compared by the DIC module 244 to the newly captured video. According to one embodiment, rotations can be for angles between 15-25 degrees. This range of angles can be a practical compromise between in-plane and out-of-plane sensitivity due to triangulation. However, in other embodiments, smaller rotation angles can be applied to insure image overlap of the object due to potential line-of-sight limitations.

Changes in the stochastic pattern captured in the video form the cameras 125 and detected by the DIC module 244 using the DIC processes can be used by the deformation detection module 248 to determine an amount of deformation, e.g., compression, torsion, strain, etc., for a particular part or portion of a part of the overall structure or device 110. That is, the DIC module 244 and DIC processes executed by the DOC module can detect changes in the stochastic pattern relative to the baseline and indicating changes in the shape of the part or portion of a part of the overall structure or device 110.

This amount of deformation can in turn be used by the fatigue and damage determination module 252 to determine an amount of fatigue and/or damage for that particular part or portion of a part of the overall structure or device 110. For example, the fatigue and damage determination module 252 can use the various mechanical properties of each part or portion of a part of the overall structure or device 110 stored in the database 228 or elsewhere and the amount of deformation detected by the DIC module 248 to determine how much fatigue and/or damage has been created in that part or portion of a part of the overall structure or device 110.

Such indications and/or results from the aliasing analysis module 252 may be provided to or otherwise utilized by the graphical user interface/generator 256. As noted above, the graphical user interface/generator 256 can generate and provide, for example through display of the fatigue and damage monitoring system 130, any of a variety of indications or summations of these results. For example, the graphical user interface/generator 256 can generate and present a video image, still image, or animated image of one or more parts or portions of the overall structure or device 110 overlaid with an indication of the determined amount of fatigue and/or damage for each parts or portions of the overall structure or device 110. These indications can include, but are not limited to, a color-coded indication of various ranges of fatigue and damage such a heatmap or similar representation. The various components of the computing system 120 may communicate utilizing the bus 260.

Figure 3:
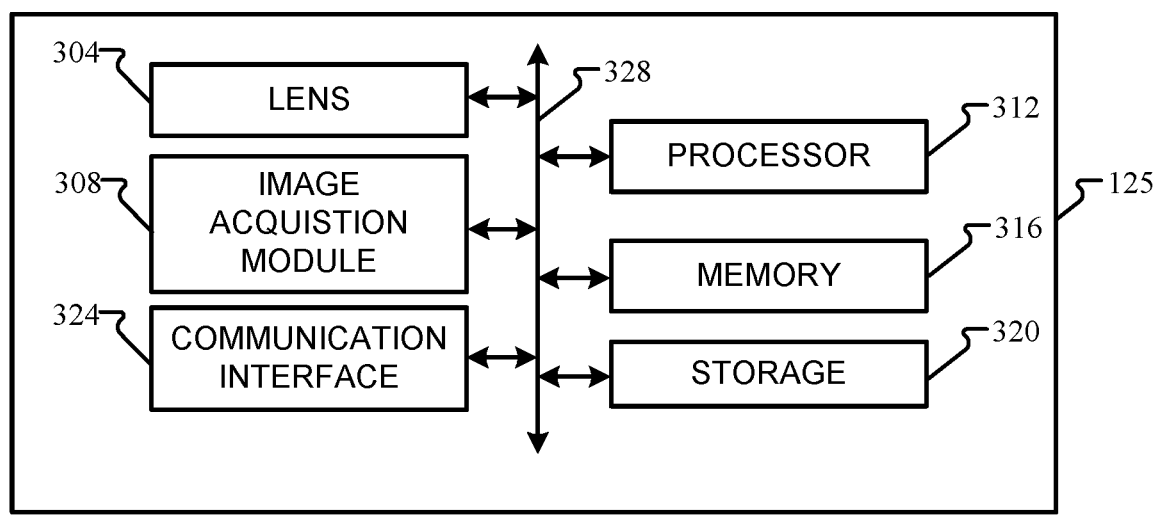
FIG. 3 is a block diagram illustrating components of an exemplary camera and data acquisition system according to one embodiment of the present disclosure.

FIG. 3 is a block diagram illustrating components of an exemplary camera and data acquisition system according to one embodiment of the present disclosure. The one or more cameras 125, whether a visual spectral range camera and/or thermal cameras, may each include a lens 304, image acquisition module 308, communication interface 324, processor 312, memory 316, storage 320, and a bus 328. The lens 304 may focus light indicative of an image onto a surface such that the image acquisition module 308 may convert the light into a digital image. The processor 312 may be the same as or similar to the processor/controller 204 previously discussed; accordingly, the description of processor 312 has been omitted. The memory 316 generally comprises software routines facilitating, in operation, predetermined functionality of the one or more cameras 125 and may be used for either permanent data storage or temporary data storage. The memory 316 may be the same as or similar to the memory 208; accordingly, the description of the memory 316 has been omitted. The data storage 320 may generally include storage for programs and data, storage for one or more modules included in each camera 125, and storage for a video or series of images. That is, the storage 320 may acquire a video of the structure 110 rotating on the turntable 105 and provide the video to the fatigue and damage monitoring system 130 via the communication interface 324. In some instances, the cameras 125 may obtain the video during a test and the video may be stored within the memory 316 and/or storage 320 such that bandwidth limitations of the fatigue and damage monitoring system 130 as well as the cables connecting the cameras 125 to the fatigue and damage monitoring system 130. Accordingly, acquired video may be subsequently transferred to and analyzed at the fatigue and damage monitoring system 130. Various components of each camera 125 may communicate utilizing the bus 328.

Figure 4:
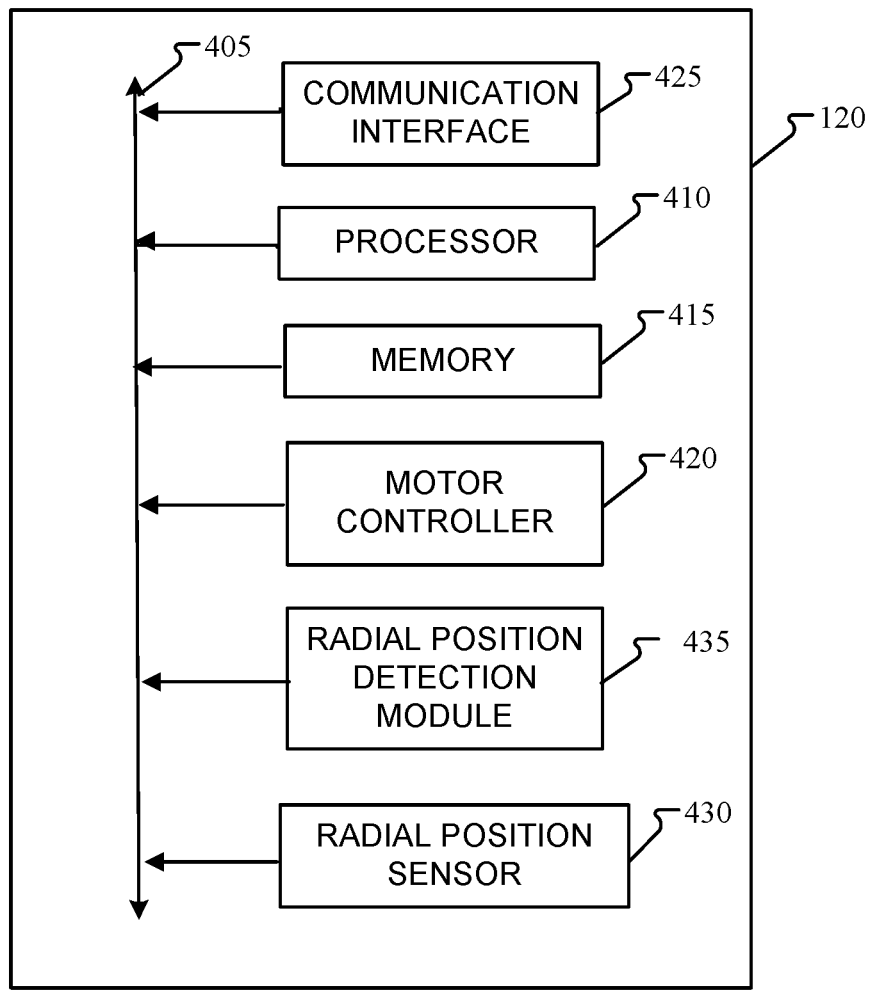
FIG. 4 is block diagram illustrating components of an exemplary turntable controller according to one embodiment of the present disclosure.

FIG. 4 is block diagram illustrating components of an exemplary turntable system according to one embodiment of the present disclosure. The turntable controller 120 can include a communication interface 425, processor 410, memory 415, motor controller 420, radial position detection module 435, and a bus 405. The processor 410 may be the same as or similar to the processor/controller 204 previously discussed; accordingly, the description of processor 410 has been omitted. The memory 415 generally comprises software routines facilitating, in operation, pre-determined functionality of the turntable controller 120 and may be used for either permanent data storage or temporary data storage. The memory 415 may be the same as or similar to the memory 208; accordingly, the description of the memory 415 has been omitted. The turntable controller can receive instructions from the fatigue and damage monitoring system 130 via the communication interface and, based on those instructions, the motor controller 420 can operate drive motors of the turntable 105 to rotate the structure 110. As the turntable 105 rotates, the rotation can be monitored by one or more radial position sensors 430 affixed to the turntable and which provide electrical signals indicating a rotation speed, a rotation distance, a specific physical location on the turntable 105 being detected, etc. Based on these signals, the radial position detection module can identify the exact position on the turntable 105, and thus the structure 110 mounted thereon, as it rotates relative to the camera position. This identified position can then be transmitted to the fatigue and damage monitoring system 130 through the communication interface 425. Various components of turntable controller 120 may communicate utilizing the bus 405.

Figure 5:
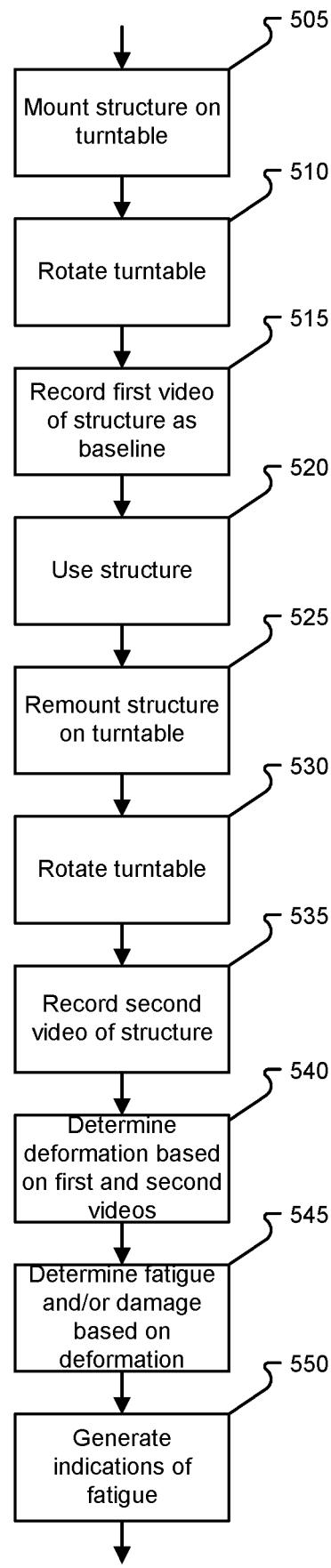
FIG. 5 is a flowchart illustrating an exemplary process for detecting and monitoring fatigue and damage in a structure or device according to one embodiment of the present disclosure.

FIG. 5 is a flowchart illustrating an exemplary process for detecting and monitoring fatigue and/or damage in a structure or device according to one embodiment of the present disclosure. As illustrated in this example, the process can begin with mounting 505 the structure 110, e.g., a rocket engine or other reusable device to be tested and monitored, onto the turntable 105. Once the structure 110 is mounted, the turntable 105 can be rotated 510, e.g., driven by electrical motors under control of the turntable controller 120 and based on instructions to the turntable controller 120 from the fatigue and damage monitoring system 130.

As the turntable 105 rotates and turns the structure 110 mounted thereon, the cameras 125 can capture and the fatigue and damage monitoring system 130 can record 515 a first video of the structure. As noted above, a set of photogrammetric targets 115A-115C can be placed at various location around the outside of the structure or device 110 and can be used to index or adjust for positioning of the structure 110 on the turntable 105. Targets can be coded or un-coded. Targets can be made from aluminum and vinyl so that thermal cameras can see gradients. Vinyl also has a well-established high emissivity of 0.95 so it can be used to find other composite, metallic, and Additive Manufactured part's emissivity. Additionally, or alternatively, the turntable controller 120 can include and/or can receive input from a radial position sensor 135. If used, the radial position sensor 135 can provide an indication of the position of the turntable 105, and thus the structure or device 110, through it's rotation and can be used to index or adjust for positioning of the structure or device 110 on the turntable 105. In these cases, the position information can also be recorded as the video is being recorded 515.

The structure 110 can then be used 520, e.g., the rocket engine can be used in a space launch. At a later time, the structure 110 can then be retested, e.g., after recovery of the rocket engine, or, in the case of another type of structure or device, at some point when the structure of device temporarily out of service. At such a time, the structure 110 can be remounted 525 onto the turntable 105. Once again, the turntable 105 can be rotated 525, the cameras 125 can capture video images of the structure as it is rotated and the fatigue and damage monitoring system 130 can record 535 a second video of the surfaces of the structure 110.

Using the first recorded 515 video and the second recorded 535 video, the fatigue and damage monitoring system can determine 540 an amount of deformation for various parts or portions of the structure 100. As noted above, the stochastic pattern recorded as the baseline first video for the structure 110 can be compared to the newly captured second video by the fatigue and damage monitoring system 130 using DIC processes. Changes in the stochastic pattern captured in the video form the cameras 125 and detected by the fatigue and damage monitoring system 130 using the DIC processes can be used to determine 540 the amount of deformation, e.g., compression, torsion, strain, etc., for a particular part or portion of a part of the overall structure or device 110.

This amount of deformation can in turn be used by the fatigue and damage monitoring system 130 to determine 545 an amount of fatigue and damage for that particular part or portion of a part of the overall structure or device 110. That is, knowing the mechanical properties of each part or portion of a part of the overall structure or device 110 and the amount of deformation detected, the fatigue and damage monitoring system 130 can determine 545 how much fatigue and/or damage has been created in that part or portion of a part of the overall structure or device 110.

Once the amount of fatigue and/or damage for various parts or portions of the overall structure or device 110 has been determined 545, the fatigue and damage monitoring system 130 can generate 550 and provide, for example through a graphical user interface presented through a display of the fatigue and damage monitoring system 130, any of a variety of indications or summations of these results. For example, the fatigue and damage monitoring system 130 can generate 550 and present a video image, still image, or animated image of one or more parts or portions of the overall structure or device 110 overlaid with an indication of the determined amount of fatigue and/or damage for each parts or portions of the overall structure or device 110. These indications can include, but are not limited to, a color-coded indication of various ranges of fatigue and/or damage such a heatmap or similar representation.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for monitoring a reusable structure of a space launch vehicle, the method comprising:

rotating a turntable by a turntable controller in response to instructions received from a fatigue and damage monitoring system, the turntable having mounted thereon the reusable structure of the space launch vehicle;

recording, by the fatigue and damage monitoring system, a first video of a surface of the reusable structure of the space launch vehicle while the turntable is rotating the reusable structure of the space vehicle, the first video captured by a camera at a single, fixed location relative to the turntable;

after a launch and recovery of the reusable structure of the space launch vehicle, rotating the turntable by the turntable controller in response to instructions received from the fatigue and damage monitoring system, the turntable having mounted thereon the reusable structure of the space launch vehicle;

recording, by the fatigue and damage monitoring system, a second video of a surface of the reusable structure of the space launch vehicle while the turntable is rotating the reusable structure of the space vehicle, the second video captured by the camera at the single, fixed location relative to the turntable;

determining an amount of physical deformation in three dimensions for each of the one or more parts or portions within the reusable structure of the space launch vehicle based on the first video and the second video, wherein the physical deformation comprises one or more of compression, torsion, or strain;

determining, by the fatigue and damage monitoring system, an amount of fatigue in one or more parts or portions of the reusable structure of the space launch vehicle without contact based on the deformation in each of the one or more parts or portions within the reusable structure of the space launch vehicle;

generating, by the fatigue and damage monitoring system, one or more indications of a range for the determined amount of fatigue in the one or more parts or portions of the reusable structure of the space launch vehicle; and presenting, by the fatigue and damage monitoring system through a user interface, a representation of the one or more indications of the range for the determined amount of fatigue in the one or more parts or portions of the reusable structure of the space launch vehicle.

2. The method of claim 1, wherein the reusable structure of the space launch vehicle comprises a stochastic pattern applied to the surface of the reusable structure of the space launch vehicle.

3. The method of claim 2, wherein determining the amount of physical deformation in each of the one or more parts or portions of the reusable structure of the space launch vehicle is based on the stochastic pattern applied to the surface of the reusable structure of the space launch vehicle.

4. The method of claim 3, wherein determining an amount of physical deformation in each of the one or more parts or portions of the reusable structure of the space launch vehicle based on the first video and the second video comprises applying Digital Image Correlation (DIC) processing to the first video and the second video using the stochastic pattern applied to the surface of the reusable structure of the space launch vehicle.

5. The method of claim 1, wherein the camera comprises a visual spectrum camera.

6. The method of claim 1, wherein the camera comprises a thermal camera.

7. The method of claim 1, wherein the representation of the one or more indications of the range of the determined amount of fatigue in the one or more parts or portions of the reusable structure of the space launch vehicle comprises a video image, still image, or animated image of the one or more parts or portions of the reusable structure of the space launch vehicle overlaid with a color-coded representation of the indication of the range of the determined amount of fatigue.

8. A system for monitoring a reusable structure of a space launch vehicle, the system comprising:
a turntable, wherein the reusable structure of the space launch vehicle is mounted onto the turntable when being tested;
a turntable controller coupled with the turntable and controlling rotation of the turntable;
a camera at a single, fixed location relative to the turntable, wherein the camera captures video of a surface of the reusable structure of the space launch vehicle when mounted on the turntable; and
a fatigue and damage monitoring system communicatively coupled with the turntable controller and camera, the fatigue and damage monitoring system comprising a processor and a memory coupled with and readable by the processor and storing therein a set of instructions which, when executed by the processor, causes the processor to:
instruct the turntable controller to rotate the turntable,
record a first video of the surface of the reusable structure of the space launch vehicle captured by the camera while the turntable is rotating the reusable structure of the space vehicle,
record a second video of the surface of the reusable structure of the space launch vehicle captured by the camera while the turntable is rotating the reusable structure of the space vehicle, the second video recorded after a launch and recovery of the reusable structure of the space launch vehicle,
determine an amount of physical deformation in three dimensions for each of the one or more parts or portions within the reusable structure of the space launch vehicle based on the first video and the second video, wherein the physical deformation comprises one or more of compression, torsion, or strain, and
determine an amount of fatigue in one or more parts or portions of the reusable structure of the space launch vehicle without contact based on the deformation in each of the one or more parts or portions within the reusable structure of the space launch vehicle,
generate one or more indications of a range for the determined amount of fatigue in the one or more parts or portions of the reusable structure of the space launch vehicle; and
present, through a user interface, a representation of the one or more indications of the range for the determined amount of fatigue in the one or more parts or portions of the reusable structure of the space launch vehicle.

9. The system of claim 8, wherein the reusable structure of the space launch vehicle comprises a stochastic pattern applied to the surface of the reusable structure of the space launch vehicle.

10. The system of claim 9, wherein determining the amount of physical deformation in each of the one or more parts or portions of the reusable structure of the space launch vehicle is based on the stochastic pattern applied to the surface of the reusable structure of the space launch vehicle.

11. The system of claim 10, wherein determining an amount of physical deformation in each of the one or more parts or portions of the reusable structure of the space launch vehicle based on the first video and the second video comprises applying Digital Image Correlation (DIC) processing to the first video and the second video using the stochastic pattern applied to the surface of the reusable structure of the space launch vehicle.

12. The system of claim 8, wherein the camera comprises a visual spectrum camera.

13. The system of claim 8, wherein the camera comprises a thermal camera.

14. The system of claim 8, wherein the representation of the one or more indications of the range of the determined amount of fatigue in the one or more parts or portions of the reusable structure of the space launch vehicle comprises a video image, still image, or animated image of the one or more parts or portions of the reusable structure of the space launch vehicle overlaid with a color-coded representation of the indication of the range of the determined amount of fatigue.

15. A fatigue and damage monitoring system comprising:
a processor; and
a memory coupled with and readable by the processor and storing therein a set of instructions which, when executed by the processor, causes the processor to monitor a reusable structure of a space launch vehicle by:
recording a first video of a surface of the reusable structure of the space launch vehicle captured by the camera while the reusable structure of the space launch vehicle is being rotated on a turntable, the first video recorded before a launch and recovery of the reusable structure of the space launch vehicle,
recording a second video of the surface of the reusable structure of the space launch vehicle captured by the camera while the reusable structure of the space launch vehicle is being rotated on the turntable, the second video recorded after the launch and recovery of the reusable structure of the space launch vehicle,
determining an amount of physical deformation in three dimensions for each of the one or more parts or portions within the reusable structure of the space launch vehicle without contact based on the first video and the second video, wherein the physical deformation comprises one or more of compression, torsion, or strain, determining an amount of fatigue in one or more parts or portions of the reusable structure of the space launch vehicle based on the deformation in each of the one or more parts or portions within the reusable structure of the space launch vehicle;

generating one or more indications of a range for the determined amount of fatigue in the one or more parts or portions of the reusable structure of the space launch vehicle; and presenting, through a user interface, a representation of the one or more indications of the range for the determined amount of fatigue in the one or more parts or portions of the reusable structure of the space launch vehicle.

16. The fatigue and damage monitoring system of claim 15, wherein determining the amount of physical deformation in each of the one or more parts or portions of the reusable structure of the space launch vehicle is based on the stochastic pattern applied to the surface of the reusable structure of the space launch vehicle by applying Digital Image Correlation (DIC) processing to the first video and the second video using a stochastic pattern applied to the surface of the reusable structure of the space launch vehicle.

* * * * *